Feb. 3, 1970   K. A. L. BERGLING ET AL   3,492,703
APPARATUS FOR CUTTING A CAST BODY OF POROUS CONCRETE IN
PLASTIC STATE BY MEANS OF A CUTTING DEVICE
MOUNTED ON THE APPARATUS
Filed May 19, 1967                              5 Sheets-Sheet 1
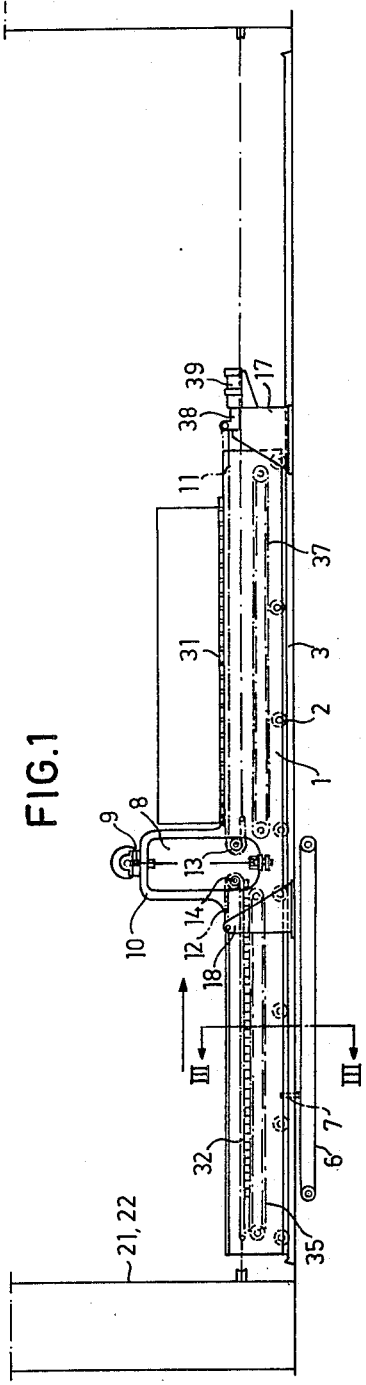
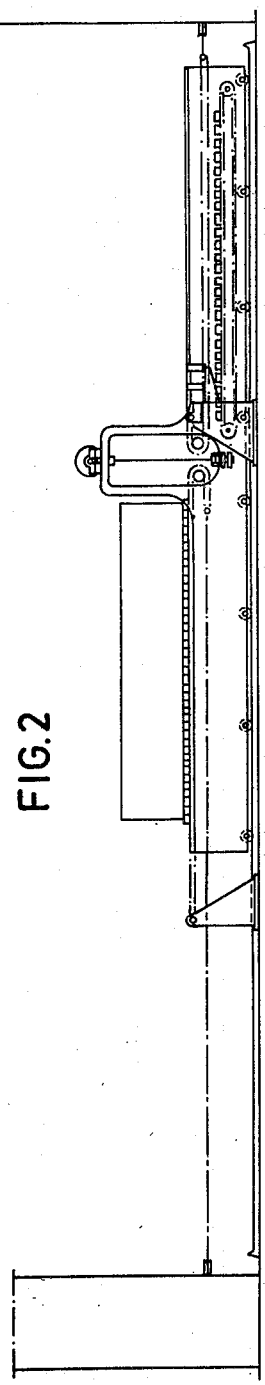
INVENTORS
Karl Aldo Ludvig Bergling
Charles Gunnar Birger Bergling
BY

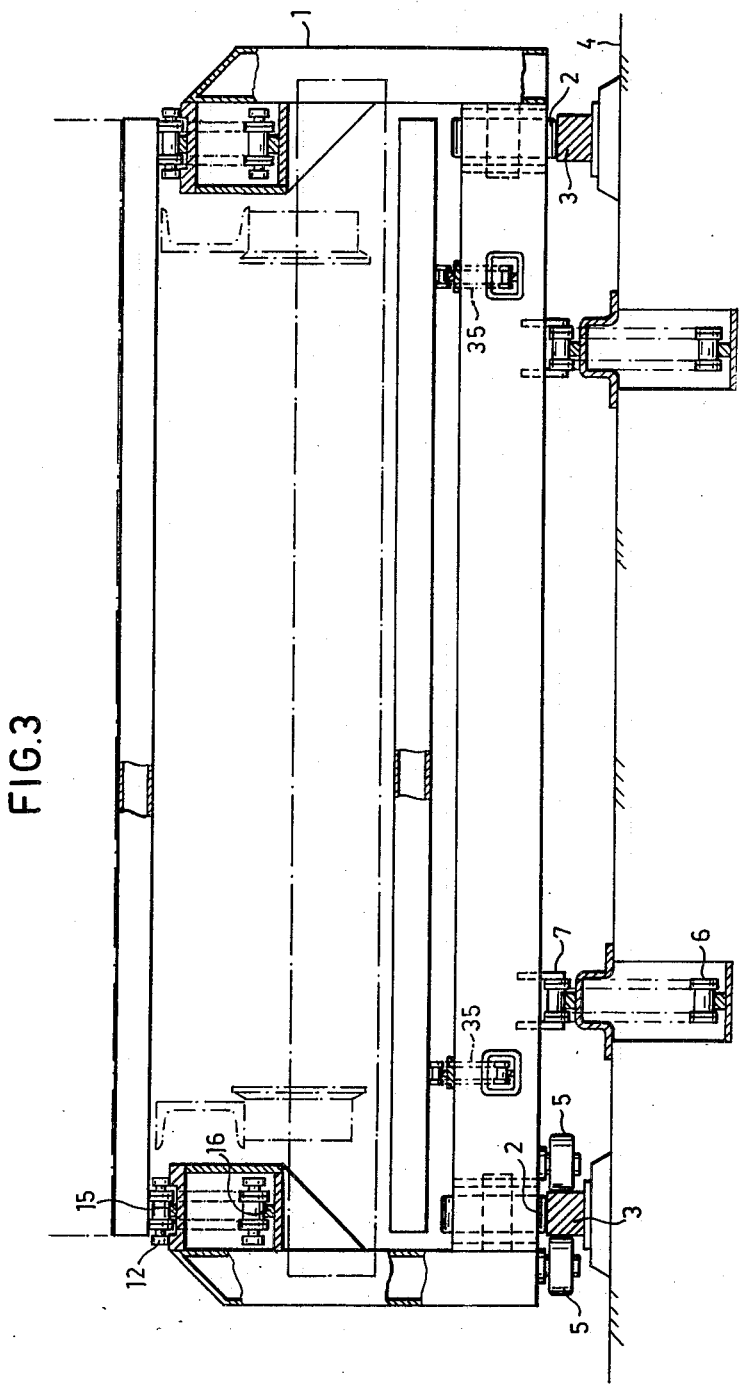

Feb. 3, 1970   K. A. L. BERGLING ET AL   3,492,703
APPARATUS FOR CUTTING A CAST BODY OF POROUS CONCRETE IN
PLASTIC STATE BY MEANS OF A CUTTING DEVICE
MOUNTED ON THE APPARATUS
Filed May 19, 1967   5 Sheets-Sheet 5
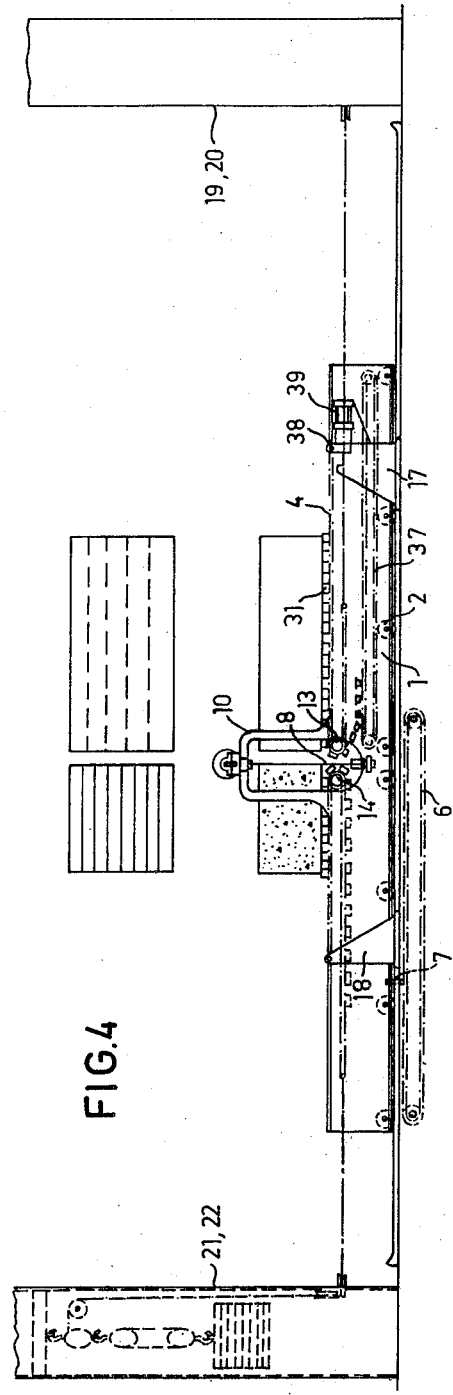
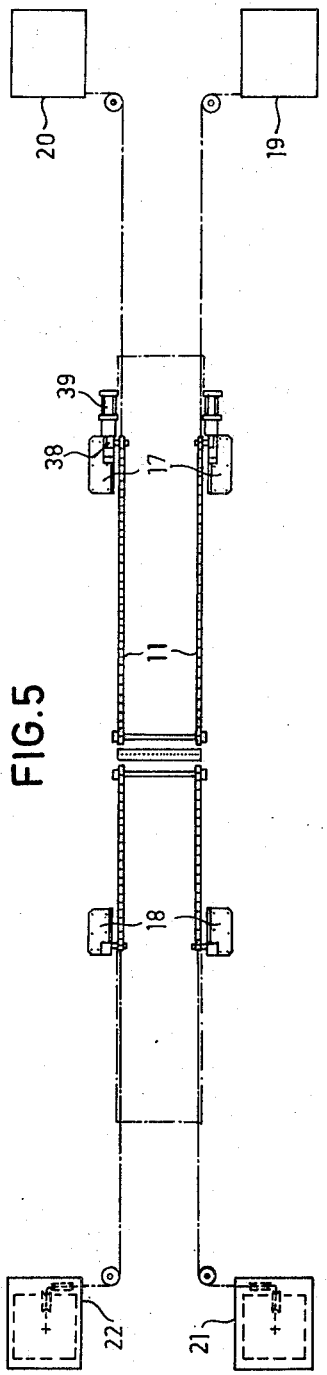
INVENTORS
Karl Aldo Ludvig Bergling
Charles Gunnar Birger Bergling
BY
Pierce, Schiffler & Parker
attorneys

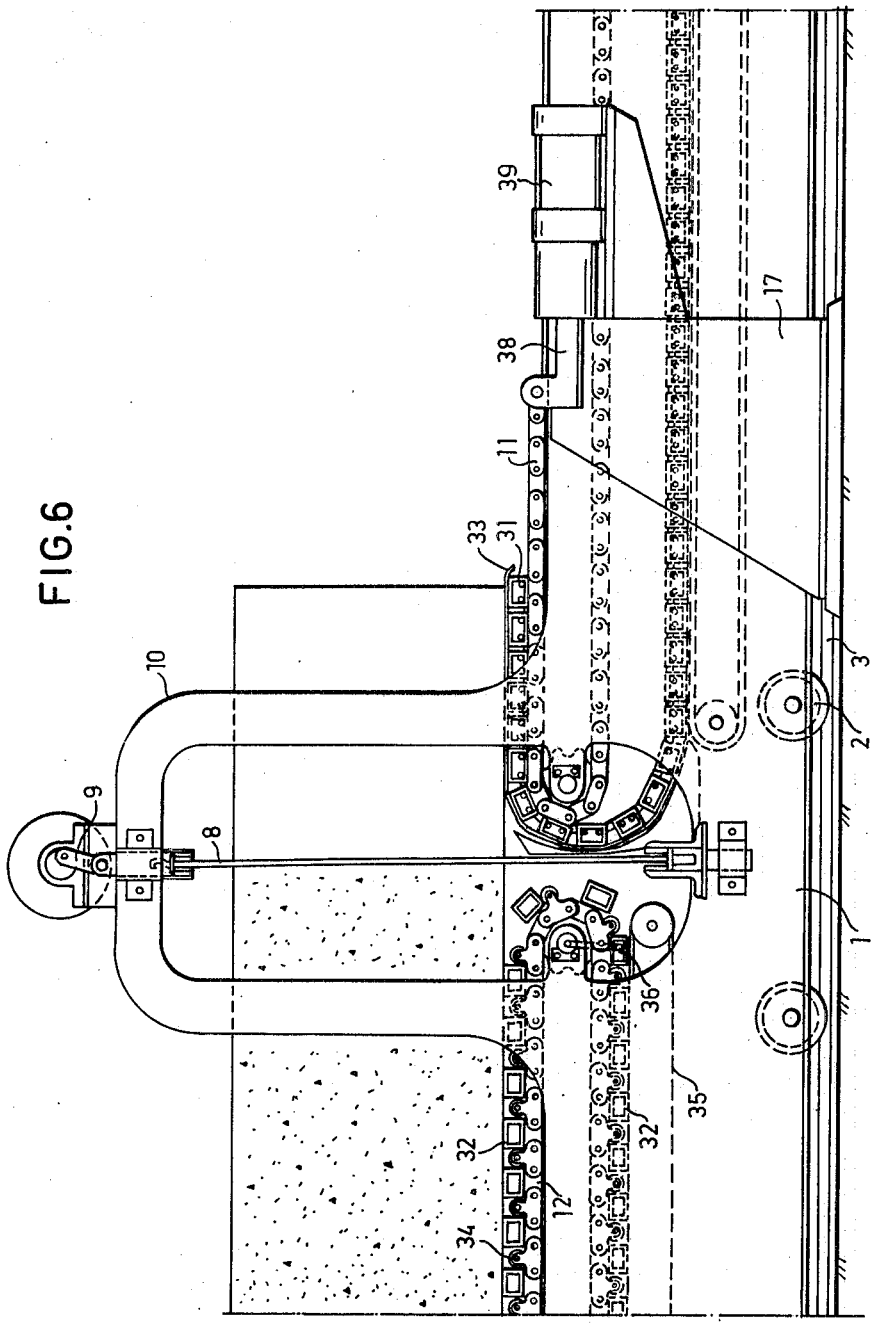

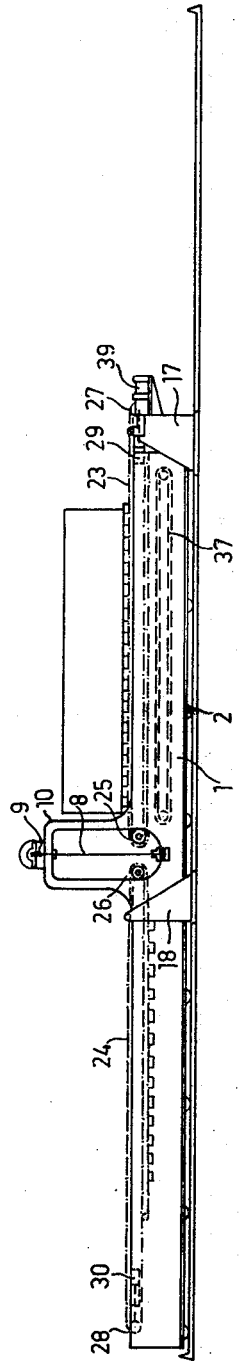

United States Patent Office 3,492,703
Patented Feb. 3, 1970

3,492,703
APPARATUS FOR CUTTING A CAST BODY OF POROUS CONCRETE IN PLASTIC STATE BY MEANS OF A CUTTING DEVICE MOUNTED ON THE APPARATUS
Karl Aldo Ludvig Bergling and Charles Gunnar Birger Bergling, Orebro, Sweden, assignors to Ingenjorsfirma Hebe AB, Orebro, Sweden, a corporation of Sweden
Filed May 19, 1967, Ser. No. 639,752
Claims priority, application Sweden, May 31, 1966, 7,408/66
Int. Cl. B28b 11/14
U.S. Cl. 25—112                                   4 Claims

ABSTRACT OF THE DISCLOSURE

An apparatus for cutting a cast body of porous concrete in plastic state by means of a cutting device mounted on the apparatus. On either side of the cutting device as viewed in the cutting direction there is provided a cutter bed for the concrete body which cutter bed is movable relative to the apparatus. The entire apparatus is displaceable, such as on wheels, in the cutting direction, and each cutter bed is secured to a place which is stationary with respect to the apparatus, the arrangement being such that upon displacement of the apparatus an uncut concrete body resting on one of the cutter beds will be moved through the cutting device and in cut condition arrive on the other cutter bed.

---

This invention relates to an apparatus for cutting a cast body of porous concrete in plastic state by means of a cutting device mounted on the apparatus, wherein on either side of the cutting device as viewed in the cutting direction there is provided a cutter bed for the concrete body which cutter bed is movable relative to the apparatus.

In previously suggested and used apparatuses for cutting plastic masses of porous concrete the concrete mass has been conveyed on apron conveyors or similar structures through a stationary cutter device. Such apparatuses have proved to be disadvantageous because of the formation of cracks or the like in the concrete mass. This inconvenience is because of the fact that the apron conveyors rest on chains driven by sprockets so that variations of the peripheral speed of a sprocket will result in different tensions in the concrete mass and cause ruptures thereof. It is also difficult to convey such a concrete mass exactly rectilinearly on an apron conveyor, with the result that the cuts will not be as uniform as desirable. The object of this invention is to eliminate the above inconveniences by preventing the occurence of tensions in the concrete body during its way through the cutting device and by rendering possible an exactly retilinear movement of the concrete body through the cutting device.

In its broadest aspect the invention is characterized in that the entire apparatus is displaceable, such as on wheels, in the cutting direction, and that each cutter bed is secured to a place which is stationary with respect to the apparatus, the arrangement being such that upon displacement of the apparatus an uncut concrete body resting on one of the cutter beds will be moved through the cutting device and in cut condition arrive on the other cutter bed.

A preferred embodiment of the invention will be described hereinbelow by way of example with reference to the annexed drawings in which FIG. 1 is a diagrammatic lateral elevation of a cutter carriage having a concrete body placed on the first cutter bed, FIG. 2 illustrates the same cutter carriage with the cut concrete body moved onto the other cutter bed, FIG. 3 is a cross-sectional view of the cutter carriage taken along the line III—III in FIG. 1, FIG. 4 illustrates how the concrete body during the cutting operation is drawn apart to permit exchange of the cutter frame, FIG. 5 is a diagrammatic plan view of the conveyor chains for the cutter beds together with counterweights for tensioning the chains, FIG. 6 is a lateral elevation to an enlarged scale of the cutter carriage close to the cutting device, and FIG. 7 is a diagrammatic view of a modified embodiment of the conveying means for the cutter beds together with pneumatic tension devices.

The cutter carriage comprises a longitudinally extended chassis 1 the length of which is at least twice the length of the longest concrete body to be cut. Provided on each side of the chassis is a row of flangeless wheels 2 which are mounted on horizontal axles and are movable on rails 3 placed on a base, such as a floor 4. On one side of the carriage guide wheels 5 mounted on vertical shafts are disposed on either side of the rail 3 in contact therewith so as to make sure that the carriage will move rectilinearly with great precision. Below the carriage a pair of parallel endless driven conveyors 6 is disposed in longitudinal hollows in the floor. The length of these conveyors is at least equal to the length of the longest concrete body to be cut. The conveyors 6 are provided with dogs 7 which take hold of the cutter carriage so as to move the carriage on the rails 3.

The cutter carriage is centrally provided with a firmly attached cutting device comprising a vertically movable cutter frame 8 provided with vertical, stretched wires. The cutter frame is displaceable in upper and lower guides and actuated by a crank device 9 located on the top of gates 10 which carry the cutting device, FIG. 6. The cutter frame 8 is readily exchangeable for other cutter frames with differently arranged cutting wires.

Provided on the top edge on either side of the cutter carriage are two conveyors 11, 12 consisting of precision chains all the links of which have plane upper and lower sides and exactly the same height. The chains pass over sprockets 13 and 14, respectively, which are located in close proximity to the cutting device. The chains rest on upper and lower rails 15, 16 which are secured to the carriage and act to guide the chains. The chains 11, 12 located on the same side of the carriage as the guide wheels 5 are guided such as to have a minimum of lateral movability. The length of each chain 11, 12 is at least equal to half the length of the carriage. One end of each chain is secured to a stationary bracket 17 or 18, respectively, mounted outside the cutter carriage. The other ends of the chains are connected each to a counterweight device 19, 20, 21 and 22, respectively, for stretching the chains. Each counterweight device must be able to exert a pulling force which is considerably greater than and by at least 50% exceeds the force required to move the entire concrete body resting on its cutter bed. The tensile strength of the chains should be great enough (at least 10 times the frictional drag) to prevent noticeable elongation of the chains in stretched condition, thereby contributing to the concrete body being practically stress-free during the cutting operation.

In the embodiment illustrated in FIG. 7 endless belts or chains 23, 24 are used which pass over inner end pulleys or sprockets 25, 26 which are mounted in fixed positions as described above, and over outer end pulleys or sprockets 27, 28 each of which is connected to a pneumatically actuated piston 29 or 30, respectively, by means of which the belts or chains 23, 24 can be stretched to a desired degree. The upper runs of the chains 23, 24 are anchored to stationary brackets 17 and 18, respectively, provided laterally of the cutter carriage.

Instead of chains, thin steel bands, ropes or the like may be used as conveyors.

Provided on the upper runs of the conveyors 11, 12 or 23, 24 is a cutter bed consisting of stripes 31, 32 which extend transversely of the carriage. The strips consist of rectangular, comparatively thin-walled box-shaped profiles of steel or other suitable material. The strips 31 from the first cutter bed on which the uncut concrete body rests and are linked together at their ends so as to form a continuous sheeting which is flexible and able to follow the movement of the conveyor chains 11 over the guide sprockets. Placed on this sheeting is a sheet 33 of plastics or preferably rubber which is in the form of an inset between the strips and the concrete body and prevents this body from being marked by the strips. The other cutter bed on which the cut concrete body rests also consists of transversely extending box-shaped strips 32 which as distinguished from the strips of the first cutter bed are not connected to each other but are advanced loosely lying on the chains 12 at equal intervals. To this end the conveyor chains 12 have entrailing means or dogs in the form of rollers 34 which are connected to the links of the chains. The loose strips 32 are located between the rollers 34. Disposed below the second cutter bed is an endless conveyor 35 on which the loose strips are moved to the end sprocket of the cutter bed conveyor where the loose strips are caught by members 36 which are entered from the ends and keep the strips in contact with the conveyor until the strips arrive on the upper horizontal run and are moved in below the cut concrete body. Below the first cutterbed there is also provided an endless conveyor 37 which receives the first cutter bed 31 and its sheeting 33 as the conveyor 37 passes the guid sprockets of the conveyor chains 11 for the first cutter bed.

If it is desired to change the thicknesses of the separated concrete elements after a part of the concrete body has been cut it is necessary to exchange the cutter frame 8. In order to render possible such exchange, the cut part and the uncut part of the concrete body have to be drawn apart so that the cutter frame can be removed and replaced by another one. Preferably, the uncut part of the concrete body is slighly moved backwards. For this purpose the ends of the conveyor chains 11 are connected to the piston rod 38 of a hydraulic cylinder 39. If the piston is moved to the right as viewed in the drawings the uncut part of the concrete body will be moved back and an interspace will be provided between the uncut part and the cut part of the concrete body so that the cutter frame can be exchanged. By way of example a concrete body having a length of 9 meters is to be divided into a 4 m. length comprising elements of a certain thickness and two 2.5 m. lengths comprising elements of a different thickness. The 4 m. elements may have a thickness of 15 cm. and the 2.5 m. elements may have a thickness of 10 cm.

The cutter carriage may be moved to and fro other than by means of the endless conveyors 6 and dogs, such as by means of racks. Further, the cutter carriage may be provided with rails on its lower side and supported by closely spaced plane travelling wheels which form a roller way having double laterally guiding wheels for the cutter carriage.

What we claim is:

1. An apparatus for cutting a cast body of porous concrete in plastic state, which comprises, a carriage displaceable as on wheels in a moving direction over a base; a cutting device stationarily mounted on the carriage; a cutter bed on either side of said cutting device as viewed in the moving direction of the apparatus, said cutter beds being movable relative to the carriage in the moving direction of the apparatus, each one of said cutter beds being secured to a place which is stationary with respect to the carriage, the arrangement being such that upon displacement of the carriage an uncut concrete body resting on one of the cutter beds will be moved through the cutting device and in cut condition arrive on the other cutter bed.

2. An appartus as claimed in claim 1, in which, the cutter beds consist of flexible conveyors which pass over guide wheels provided on either side of the cutting device.

3. An apparatus as claimed in claim 2, characterized in that one end of each conveyor is secured to a place which is stationary with respect to the apparatus and that the other end is secured to a tension device disposed outside the apparatus.

4. An apparatus as claimed in claim 2, characterized in that the conveyors are endless and pass over tension wheels.

References Cited

UNITED STATES PATENTS

| | | | |
|---|---|---|---|
| 2,692,328 | 10/1954 | Jaye | 25—112 X |
| 3,065,514 | 11/1962 | Jakobsson et al. | 25—112 X |
| 3,347,121 | 10/1967 | Wiatt | 83—71 |

J. SPENCER OVERHOLSER, Primary Examiner

DE WALDEN W. JONES, Assistant Examiner

U.S. Cl. X.R.

31—22; 83—155